United States Patent
Caselli et al.

(10) Patent No.: US 10,024,058 B2
(45) Date of Patent: Jul. 17, 2018

(54) TILE EDGE SYSTEMS AND METHODS

(71) Applicant: Mohawk Carpet Corporation, Calhoun, GA (US)

(72) Inventors: Claudio Caselli, Dallas, TX (US); Rahul Patki, Dallas, TX (US)

(73) Assignee: Mohawk Carpet Corporation, Calhoun, GA (US)

( * ) Notice: Subject to any disclaimer, the term of this patent is extended or adjusted under 35 U.S.C. 154(b) by 0 days.

(21) Appl. No.: 14/718,498

(22) Filed: May 21, 2015

(65) Prior Publication Data

US 2015/0345141 A1    Dec. 3, 2015

Related U.S. Application Data

(60) Provisional application No. 62/005,733, filed on May 30, 2014.

(51) Int. Cl.
*B05D 3/02* (2006.01)
*E04B 2/00* (2006.01)
(Continued)

(52) U.S. Cl.
CPC .............. *E04C 2/46* (2013.01); *B28B 11/001* (2013.01); *B28B 11/048* (2013.01); *B28B 11/08* (2013.01);
(Continued)

(58) Field of Classification Search
CPC ......... B32B 3/02; B32B 3/10; B32B 2419/04; E04C 2/30; E04C 2/46; E04C 2002/005;
(Continued)

(56) References Cited

U.S. PATENT DOCUMENTS 3,189,177 A * 6/1965 Mays ........................ B07C 5/36
                                                                    209/562
7,383,768 B2 * 6/2008 Reichwein ............... B41J 3/407
                                                                    101/23
(Continued)

FOREIGN PATENT DOCUMENTS

CN      101973171 A    2/2011
EP      1324888 B1     5/2004
(Continued)

OTHER PUBLICATIONS

TileMasterGa "How to Make Bullnose ( with my comments)—Round Edge Blade Stone Marble tile installation atlanta" Online video clip. https://www.youtube.com/watch?v=QTgHq8C_zl Jun. 11, 2009, accessed on Nov. 29, 2016.*

*Primary Examiner* — Robert S Walters, Jr.
(74) *Attorney, Agent, or Firm* — Troutman Sanders LLP; Ryan A. Schneider; Alexis N. Simpson

(57) ABSTRACT

Disclosed herein are tiles, systems, and methods related to manufacturing bullnose or other non-straight edge tiles. The tiles can comprise a non-straight edge with one or more printed layers. The printed layers can comprise radiation curable inks or other fast-drying coatings. Upon exposure to a curing station, the layers cure quickly. This provides a printed and cured surface that very closely matches the rest of the tile. The tiles, systems, and methods disclosed herein can be of higher quality and can involve more efficient manufacturing than existing tiles, systems, and methods.

7 Claims, 8 Drawing Sheets

(51) Int. Cl.
 *E04C 2/30* (2006.01)
 *E04F 19/04* (2006.01)
 *B32B 3/02* (2006.01)
 *B32B 3/10* (2006.01)
 *B28B 11/00* (2006.01)
 *B28B 11/04* (2006.01)
 *B28B 11/08* (2006.01)
 *B41J 3/407* (2006.01)
 *E04C 2/00* (2006.01)

(52) U.S. Cl.
 CPC ............... *B32B 3/02* (2013.01); *B32B 3/10* (2013.01); *B41J 3/4073* (2013.01); *E04C 2/30* (2013.01); *E04F 19/04* (2013.01); *B32B 2419/04* (2013.01); *E04C 2002/005* (2013.01); *Y10T 428/24793* (2015.01)

(58) Field of Classification Search
 CPC ...... E04F 19/04; B28B 11/001; B28B 11/048; B28B 11/08; B41J 3/4073; Y10T 428/24793
 See application file for complete search history.

(56) References Cited

U.S. PATENT DOCUMENTS

| | | | |
|---|---|---|---|
| 7,550,192 B2* | 6/2009 | Dempsey | B26F 1/40 428/161 |
| 7,703,575 B2* | 4/2010 | Berger, II | E04B 9/001 181/286 |
| 2002/0046576 A1* | 4/2002 | Campbell | B44C 1/28 65/56 |
| 2007/0085983 A1 | 4/2007 | Ko et al. | |
| 2007/0115336 A1* | 5/2007 | Ko | B41J 3/407 347/102 |
| 2008/0261000 A1 | 10/2008 | White et al. | |

FOREIGN PATENT DOCUMENTS

| | | | |
|---|---|---|---|
| FR | 2868735 A1 * | 10/2005 | |
| SI | 23200 A2 | 4/2011 | |
| WO | 2007054812 A3 | 10/2007 | |

* cited by examiner

TILE EDGE SYSTEMS AND METHODS

CROSS-REFERENCE TO RELATED APPLICATIONS

This application claims priority to, and the benefit under 35 U.S.C. § 119(e) of, U.S. Provisional Patent Application No. 62/005,733, filed 30 May 2014, the entire contents and substance of which are hereby incorporated by reference as if fully set forth below.

BACKGROUND

1. Field of the Invention

Embodiments of this disclosure relate to tile systems and methods, and more particularly, to systems and methods for applying coatings to the edge of a tile.

2. Description of Related Art

A variety of tile systems and methods are known. In general, tile is a manufactured material used for covering floors, walls, roofs, and other similar areas. In many situations, tile can provide a desirable appearance, texture, feel, or other surface characteristic that is difficult or impossible to achieve by other means. Tiles are commonly made from ceramic materials, although they can be made from a variety of other materials such as wood, stone, metal, and glass.

Tiles are available in a variety of shapes. Moreover, tiles are available with a variety of side profiles. As shown in FIG. 1, for example, tiles are available in a standard design 100 having four straight edges 105. These standard tiles 100 are common in the marketplace.

As shown in FIG. 2, tiles with a bullnose design 200 are also available. These bullnose tiles 200 have one or more bullnose edges 205. Bullnose edges 205 can be rounded, convex edges on one or more sides of the tile 200. Bullnose tiles are useful for several purposes, including creating an aesthetically pleasing transition between the tile and a wall the tile is mounted on, for example. Such a transition can be desirable when a tile pattern on a wall does not extend to the end of the wall, and thus a progression from the tile pattern to the wall is desired. Bullnose tile also provides a smooth, rounded, and desirable edge for tiles located at the top of a wall, at corners, near stairs, around countertops, at bathtub surrounds and other like areas.

To manufacture bullnose tile, the tile can either be pressed to its desired shape or cut from field tile to provide a smooth rounded edge. Pressing is generally not preferred, as this commonly leads to problems with over-application or under-application of decoration on the rounded edge. While cutting the bullnose edge is often preferred, cutting from field tile and subsequently rounding off the edge exposes the underlying tile base with no decoration. Thus, the exposed edge must be decorated to match the design on the face of the tile. If the decoration is done with glazes and ceramic inks, the tile will need to be re-fired in a kiln. This creates coloring and shading mismatch problems because the decoration on the top surface 210 of the tile 200 is fired twice. Accordingly, to attempt to avoid such problems, decoration can be done by manually spraying multiple coats of paint onto the tile edge. Unlike the glazes and ceramics, the paint does not need to be fired in a kiln. The paint often includes a monochromatic base coat plus a speckle or dot coat and an optional protective clear coat. The speckle coat is used to simulate the look or the design on the face of the tile. The sprayed paint is then air cured or heat cured in hot dryers. This process has several disadvantages.

First, the speckled paint will almost always provide a different finish than the existing design on the top surface of the tile, which makes the bullnose tile aesthetically undesirable. Second, the process of manually loading cut tiles into carts, mixing the paint, spraying multiple coats on tiles, and moving carts in and out of dryers is very labor intensive and adds significant labor cost and time to the manufacturing process. Third, the paint needs to be tinted and a large number of color recipes created and controlled if a manufacturer wishes to attempt to match a large number of tile designs. Fourth, air or heat curing takes a long time, which slows production. These are just some examples of the drawbacks present in the current state of the art. Moreover, these shortcomings are present during manufacturing of different types of tiles with non-straight edges (such as tiles with beveled edges), not just bullnose edges.

A problem arising with decorated beveled tiles, or with other tiles having a lowered surface at their perimeter or at a portion of their perimeter, is that common decoration techniques for creating the design on the tile's face, such as rotogravure printing or screen printing, may not be capable of printing on the lowered portions at the perimeter with acceptable quality. For this reason, often such lowered portions are not printed with a design or pattern at all, and instead have the basic, practically uniform color of the tile. Similar problems also arise with tiles having straight or perpendicular edges, for example, with wall tile or floor tile where a user wants to expose the side edge of the tile, e.g., at the boundaries of a tiled surface.

What is needed, therefore, is a tile and tile manufacturing process that provides a bullnose edge, or other non-straight edge, a lowered perimeter portion of a tile, or even a straight edge of a tile, that matches the rest of the tile, and does so in an efficient manner. It is to these needs that embodiments of this disclosure are primarily directed.

SUMMARY

Briefly described, embodiments of this disclosure include a tile with a bullnose edge, or other decorative edge, and methods of manufacturing and using such tile. During manufacturing, a tile can be placed on a conveyor and cut into bullnose form. If the tile is wet, it can then be dried. After drying, a design matching the design on the top of the tile, or another design, can be printed onto the bullnose edge with one or more printers. The ink from the printer can then be cured. Finally, the tiles can be sorted and packaged. This process can produce a tile with a near perfect color/design match between the bullnose edge or other decorative edge and the top of the tile. This also provides a tile manufacturing process that is significantly streamlined compared to known methods. Of course, intermediate steps and rearrangement of the steps mentioned above are possible and contemplated by this disclosure.

Some aspects of the present disclosure relate to a method of manufacturing a bullnose tile, comprising printing a decorative coat comprising print media on a bullnose edge of the bullnose tile, and curing the print media. In some embodiments, the print media comprises radiation curable ink. In some embodiments, the method of manufacturing a bullnose tile further comprises coating at least one of a tie coat or a base coat on the bullnose edge of the bullnose tile and curing the at least one of the tie coat or the base coat. In some embodiments, the method of manufacturing a bullnose tile further comprises coating a protective coat on the bullnose edge of the bullnose tile and curing the protective coat. In some embodiments, the curing process comprises exposing the print media to a radiation lamp. In some embodiments the method further comprises wet cutting a tile to form the bullnose tile, profiling the tile to provide a smooth rounded edge to the bullnose tile, drying the bullnose tile after wet cutting, and sorting and packaging the tile after the curing process. In some embodiments, the tile is transported on an in-line conveyor system during wet cutting, drying, printing, and curing.

Some aspects of the present disclosure relate to a system for manufacturing a bullnose tile comprising a first printing station configured to print a decorative coat, onto a bullnose edge of a bullnose tile, and a first curing station for curing the decorative coat. In some embodiments, the system can further comprise a first coating station configured to coat at least one of a tie coat or a base coat onto the bullnose edge of the bullnose tile, and a second curing station for curing the at least one of the tie coat or the base coat. In some embodiments, the system can further include a second coating station configured to coat a protective coat onto the bullnose edge of the bullnose tile, and a third curing station to cure the protective coat. In some embodiments, the system further comprises a cutting station configured to wet cut the bullnose edge into the bullnose tile, a drying chamber configured to dry the bullnose tile, and a sorting and packaging station configured to sort and package the bullnose tile for shipment. In some embodiments, the system can separately include a profiling station for profiling the tile to provide a smooth rounded edge to the bullnose tile, or profiling may be performed by the cutting station or drying chamber. In some embodiments, the system further comprises a conveyor system to transport the tile to the cutting system, drying chamber, first printing station, and first curing station, the conveyor system configured such that the tile remains on a conveyor during cutting, drying, printing and curing. In some embodiments, the first printing station comprises one or more inkjet printers. In some embodiments, the inkjet printers printing print media comprise radiation curable ink. In some embodiments, the curing station comprises one or more radiation lamps. In some embodiments, the system further comprises a second printing station. In some embodiments, the system is configured to transport the tile from the first curing station to the second printing station. In some embodiments, the system is configured to transport the tile from the second printing station to a second curing station.

Some aspects of the present disclosure relate to a tile comprising a decorative edge and a first coat printed onto the decorative edge and cured. In some embodiments, the decorative edge is one of a bullnose edge, a straight edge, a beveled edge and a lower perimeter portion. In some embodiments, the tile further comprises a second coat printed onto the decorative edge and cured. In some embodiments, the second coat is a decorative coat. In some embodiments, the tile further comprises a third coat printed onto the decorative edge and cured.

These and other embodiments of this disclosure are described in the Detailed Description below and the accompanying figures. Other embodiments and features of embodiments of this disclosure will become apparent to those of ordinary skill in the art upon reviewing the following description of embodiments of this disclosure in concert with the figures. While features of this disclosure may be discussed relative to certain embodiments and figures, all embodiments of this disclosure can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments, it is to be understood that such exemplary embodiments can be implemented in various devices, systems, and methods of this disclosure.

BRIEF DESCRIPTION OF THE DRAWINGS

Various features and advantages of this disclosure may be more readily understood with reference to the following Detailed Description taken in conjunction with the accompanying drawing figures, wherein like reference numerals designate like structural elements, and in which.

DETAILED DESCRIPTION

Figure 1:
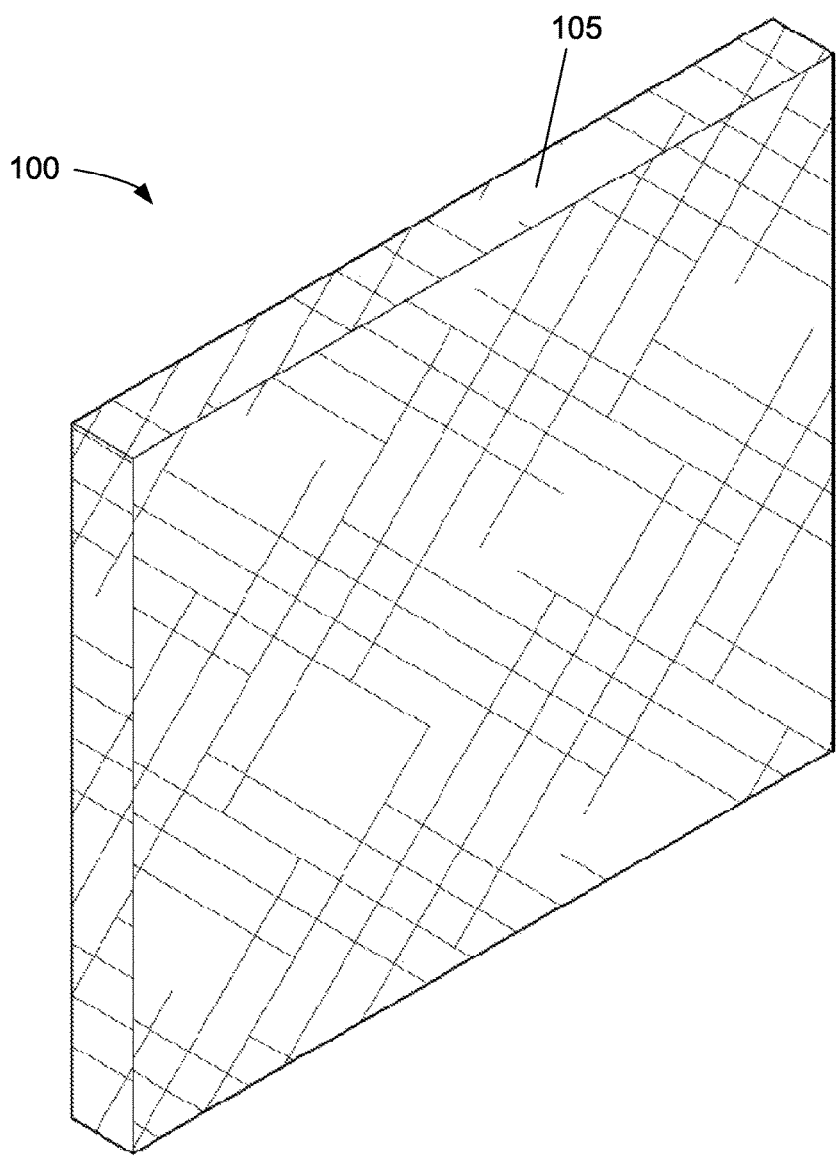
FIG. 1 depicts a standard or field tile.

To facilitate an understanding of the principles and features of the various embodiments of the invention, various illustrative embodiments are explained below. Although exemplary embodiments of the invention are explained in detail as being systems and methods for manufacturing tile, and the tile itself, it is to be understood that other embodiments are contemplated, such as embodiments employing other types of manufacturing processes, manufacturing steps, tiles, tile edges, and the like. Accordingly, it is not intended that the invention is limited in its scope to the details of construction and arrangement of components set forth in the following description or examples. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. Moreover, where the terms "bullnose" or "bullnose tile" are used, these terms may contemplate tiles with other types of non-straight edges known in the art, such as beveled edges, for example.

Ranges may be expressed herein as from "about" or "approximately" or "substantially" one particular value and/ or to "about" or "approximately" or "substantially" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

To facilitate an understanding of the principles and features of this disclosure, various illustrative embodiments are explained below. In particular, various embodiments of this disclosure are described as tiles and also systems and methods for manufacturing tiles. Some embodiments of the invention, however, may be applicable to other contexts, and embodiments employing these variations are contemplated. For example and not limitation, some embodiments of the invention may be applicable to various types of surface covers, rounded edges, straight edges, angled edges, or other applications altogether. Accordingly, where terms such as "tile" or "bullnose" or "beveled" or related terms are used throughout this disclosure, it will be understood that other devices, entities, objects, shapes, or activities can take the place of these in various embodiments of the invention.

As described above, a problem with existing tiles and tile manufacturing processes, especially those that encompass decorative edges, such as non-straight, bullnose edges, is that such edges will undesirably have a different finish than the top of the tile. In addition, the manufacturing processes that yield these tiles are inefficient, as they require several manual steps and the use of various paints and other coatings with long drying times.

The present disclosure, however, describes tiles and methods of manufacturing tiles that solve these problems. Specifically, a tile can be placed on a conveyor and cut into bullnose form. Since the cutting can be a wet-cutting process, the tile can then be dried. According to some embodiments, after drying, a base coat and/or a tie coat may be applied to the edge of the bullnose tile by a coating station, which may then be cured by a curing station. After drying and optionally coating and curing, a design matching the design on the top of the tile can be printed onto the decorative edge, such as on the bullnose edge, with a print head positioned at a particular angle. The ink from the printer can then be cured. These steps can be accomplished without removing the tile from the conveyor. According to some embodiments, a second coating, such as a protective coating can then be added to the bullnose tile and subsequently cured by a curing station. Finally, the tiles can be sorted and packaged. This process produces a tile with a near perfect color and design match between the bullnose edge and the top of the tile, where desired. This process also provides a method for tile manufacturing that is significantly streamlined compared to known methods.

Advantageously, embodiments of the present disclosure can use printers to print one or more print media, which can include ink, on the decorative edge, such as on the bullnose edge of the tile. In some embodiments, the print media, or decorative inks, can include one or more radiation curable inks applied in one or more layers. More specifically, the print media can include a radiation curable base coat, radiation curable decorative coat, and, optionally, a radiation curable protective coat. The print media and inks can be cured after each layer is applied, after some layers are applied, or after all layers are applied. These radiation curable inks provide several advantages. For example, they dry quickly when exposed to radiation lamps, they enable more accurate color and design matching than conventional paints, and they are simple to apply with the right equipment. In addition, there are zero VOC and solvent emissions associated with 100% solids radiation curable print media. In some embodiments, the base coat and/or the protective coat can be applied by techniques other than printing, such as, for example, by roller coating and/or spray coating, while the decorative coat is applied by printing as described herein. Decorative inks can be acrylate monomer and oligomer based, UV curable, and can be available in multiple colors, for example, cyan, magenta, yellow and black.

Figure 2:
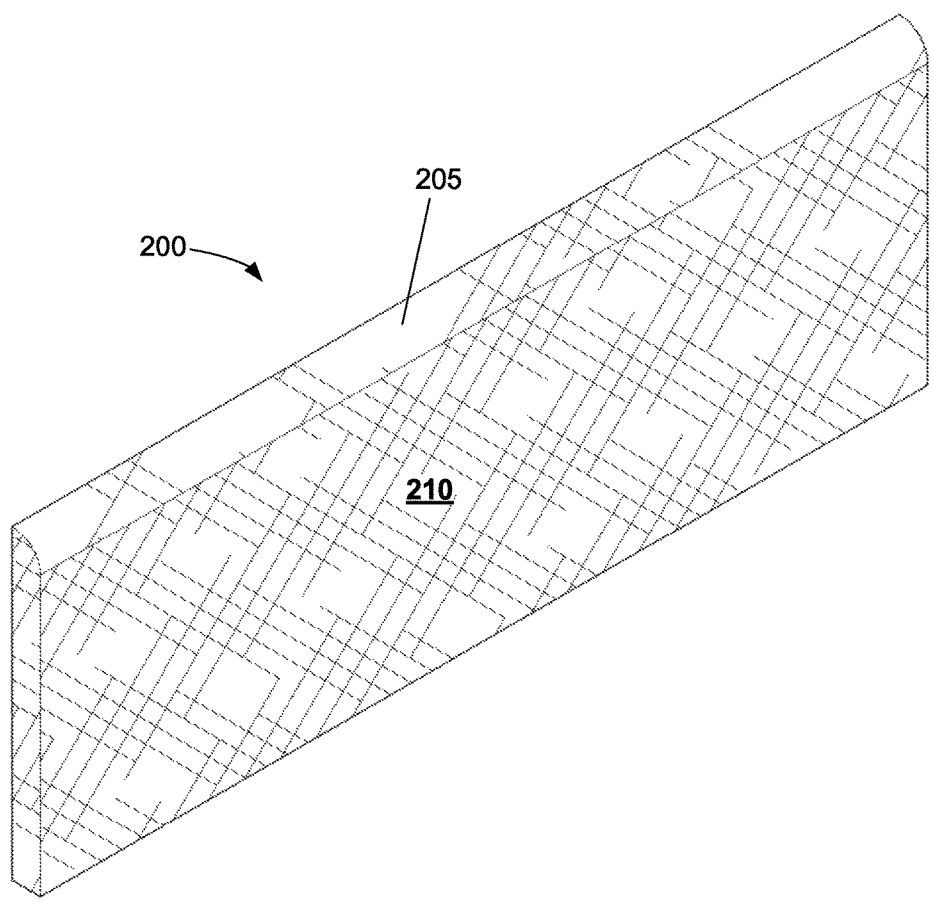
FIG. 2 depicts a conventional bullnose tile.

As described above, FIG. 1 shows a standard tile 100 and FIG. 2 shows a bullnose tile 200. By comparing FIGS. 1 and 2, one can see that a difference between the tiles is that the bullnose tile 200 has a rounded, bullnose edge 205. As discussed above, the bullnose edge 205 can be desirable in many scenarios, including in transition areas between a tile and a wall, at corners, at surrounds, etc.

Figure 3:
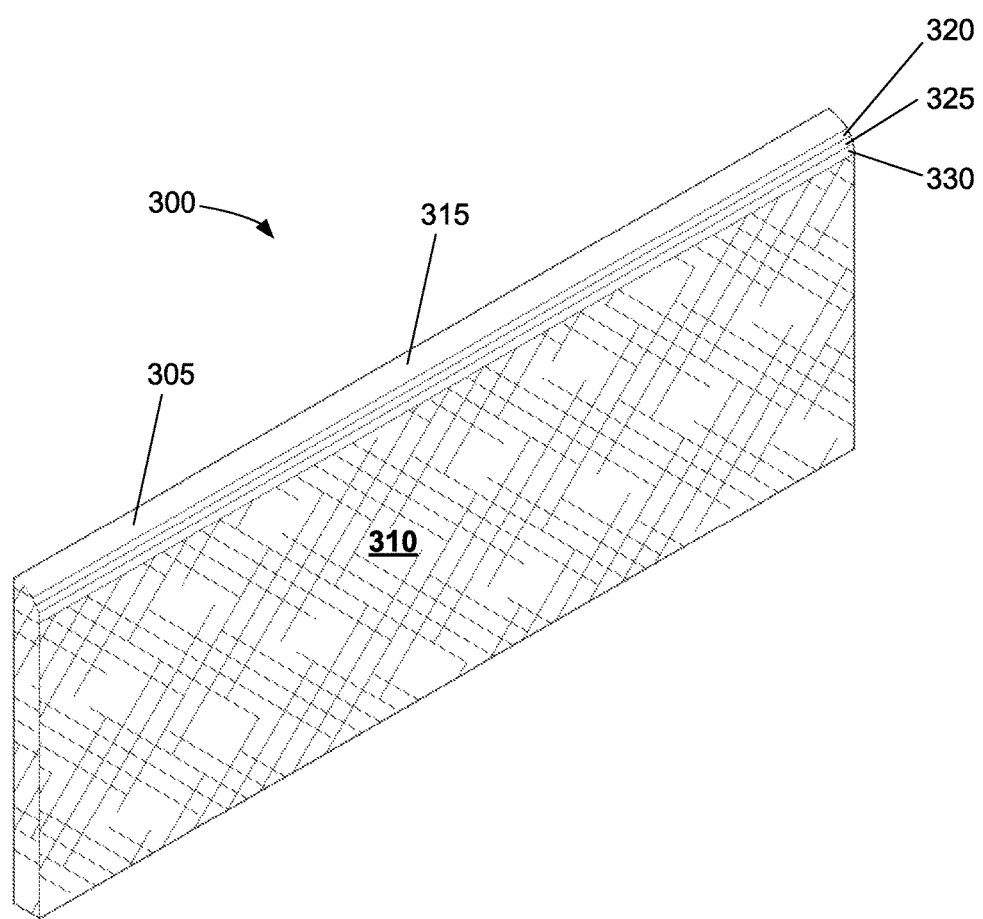
FIG. 3 depicts the standard or field tile of FIG. 1 cut into bullnose form, in accordance with some embodiments of this disclosure.

To manufacture a bullnose tile, a field or standard tile 100 can be cut into bullnose form. In other words, an edge of the field tile 100 can be cut into a rounded, convex shape to form a bullnose tile 200. While this process provides the shape desired by manufacturers and end users, the cut also reveals the undecorated base of the tile 315, as shown in FIG. 3. The bullnose tile 200 can also be smaller than the field tile 100, and thus the field tile 100 can be cut into one or more bullnose tiles 200.

FIG. 3 shows a field tile 100 that has been cut into bullnose form. As mentioned above, the cut bullnose tile 300 has an undecorated base 315. The undecorated base 315 is the previously interior core portion of the tile that is now exposed because the edge of the tile 105 has been cut away. The undecorated base 315, therefore, does not have any paint or finish. Likewise, as also shown in FIG. 3, the cutting will reveal cross-sections of any layers of glaze, such as engobe 320, glaze 325, and protective over-glaze 330 which were applied to the standard tile 100 before cutting.

To ensure that the bullnose edge 305 matches the top of the tile in appearance, a manufacturer can apply a finish to the bullnose edge 305 after cutting. Preferably, when desired, this finish will match the finish on the top 310 of the tile 300, or come as close as is practical. This makes the tile uniform, which is appealing to prospective purchasers.

In the past, during manufacturing, paint has been manually applied to the bullnose edges 305 of tiles 300 with brushes or spray guns, for example. As discussed in more detail below, this process is labor intensive and time consuming. Moreover, painting rarely results in a near perfect match between the dried paint on the bullnose edge 305 and the finish on the top 310 of the tile 300. Embodiments of the present disclosure, however, use printers to print the same graphic used on the top 310 of the tile 300 onto the bullnose edge 305. This results in a better match between the finish on the bullnose edge 305 and the top 310 of the tile 300, and is also more efficient.

Figure 4:
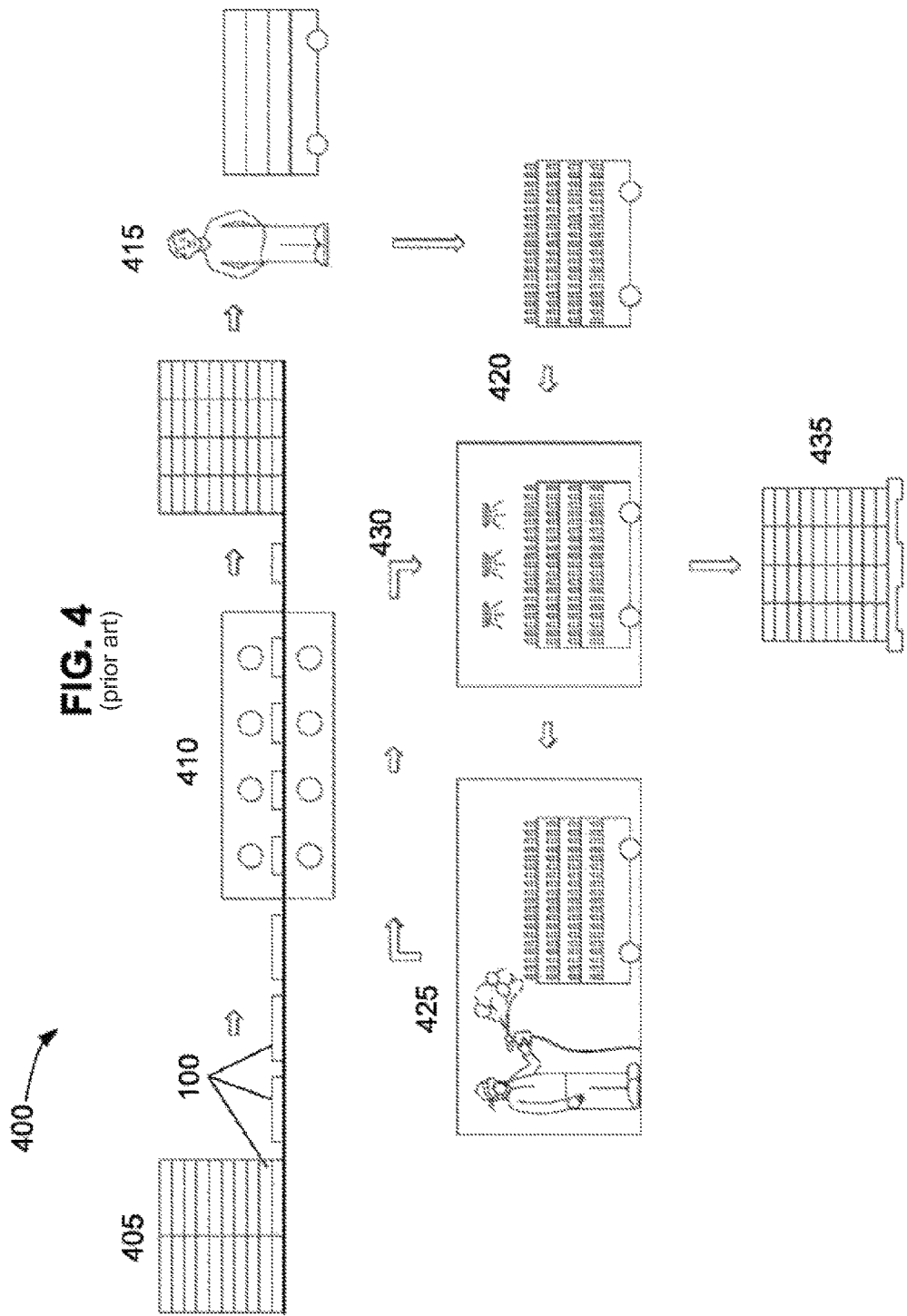
FIG. 4 depicts a conventional process for manufacturing bullnose tile.

FIG. 4 shows a flow diagram of a known manufacturing process 400 for bullnose tile. In this process, field tiles 100 are loaded onto a conveyor at step 405. The field tiles 100 are then cut or milled at step 410. After cutting or milling, the cut tiles are manually loaded onto a cart at step 415. The cart is then brought into a dryer or drying chamber at step 420. The dried tiles are then manually painted at step 425. Since the paint is wet, the tiles are brought back to the drying chamber and dried again at step 430. This process of painting and drying can repeat itself as many times as needed to apply and dry the desired number of layers of paint and/or protective coating. This process can be very time and labor intensive, as it includes manual painting, long drying times of up to twenty minutes or more per drying period, and manual movement of the tiles. After the painting and drying cycle(s) are complete, the tiles are brought to a sorting and packaging station where they can be sorted and packaged for shipment at step 435. Unfortunately, however, the process described above often yields bullnose edges of the finished tiles with a different finish than the rest of the tile due to the shortcomings of the painting and drying process.

The present disclosure can provide several advantages over the known process described above with reference to FIG. 4, as well as other known manufacturing processes. Specifically, systems and methods of the present disclosure can reduce the number of manual steps needed to manufacture bullnose tile, can expedite the manufacturing process, and can produce a higher quality final product.

Figure 5:
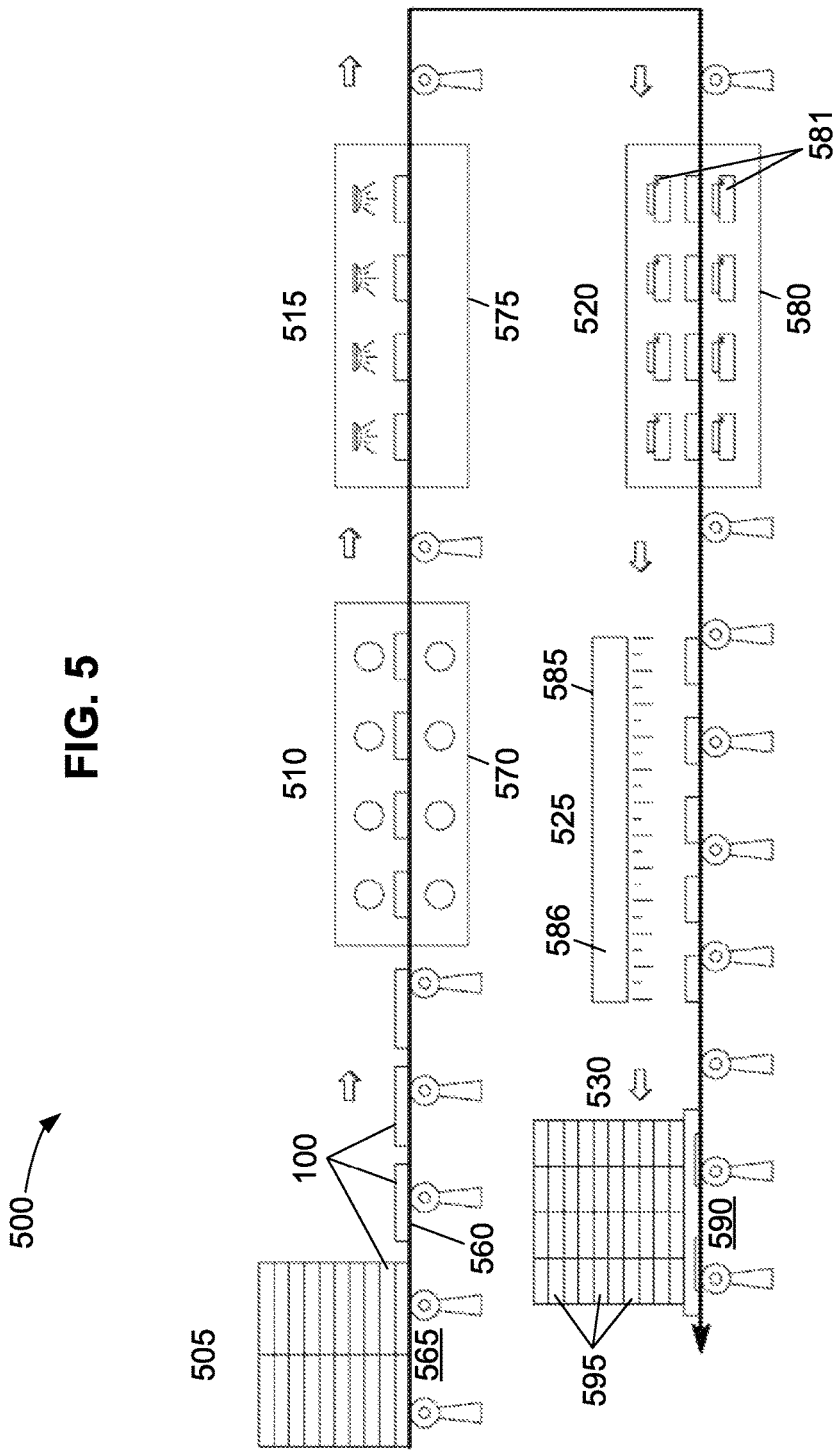
FIG. 5 depicts a process for manufacturing bullnose tile, in accordance with some embodiments of this disclosure.

FIG. 5 shows a flow diagram of a manufacturing process 500 for bullnose tile in accordance with some embodiments of this disclosure. In an exemplary process, field tiles 100 are loaded onto a conveyor system 560 at tile loading/unloading station 565 at step 505. The conveyor system 560 transports the field tiles 100 through a wet cutting or milling station 570 at step 510. This cutting or milling can incorporate the bullnose edge, or other edge, into the tile 300. After cutting or milling, and now in bullnose form, the tiles 300 can remain on the conveyor system 560 and the conveyor system 560 can transport the tiles through a drying chamber 575 at step 515. In some embodiments the drying chamber may be an in-line drying chamber, allowing the tiles to move through the chamber without stopping. The dried tiles can then be transported by the conveyor system 560 through one or more print stations 580. The print station 580 can comprise printers that print one or more layers of print media, which can include radiation curable ink(s), on the bullnose edge of the tile at step 520. After printing, the radiation curable inks can be cured by exposing the inks to radiation lamps at one or more curing stations 585 at step 525. If one or more additional layers of print media are desired to be applied on top of the tiles, multiple printing stations 580 and curing stations 585 can be placed in series. Alternatively, the conveyor system 560 can have an optional rerouting pathway, or loop, to redirect the tiles through the print station 580 and curing station 585 as many times as desired or necessary. After printing 520 and curing 525 are complete, the tiles are brought to a sorting and packaging station 590 where they can be sorted and packaged for shipment at step 530.

Figure 6:
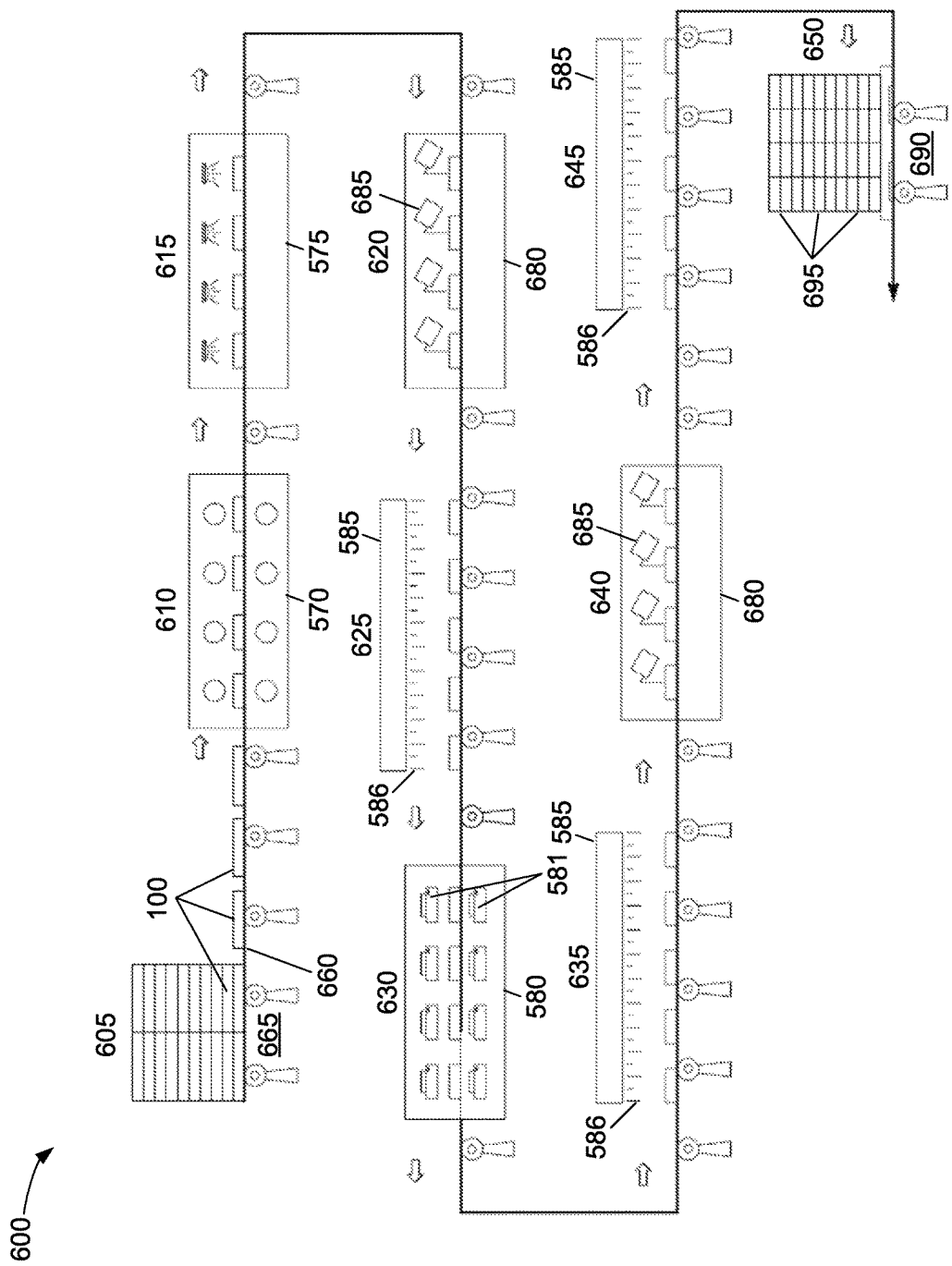
FIG. 6 depicts a process for manufacturing bullnose tile, in accordance with some embodiments of this disclosure.

FIG. 6 shows a flow diagram of a manufacturing process 600 for bullnose tile in accordance with this disclosure. In an exemplary process, field tiles 100 are loaded onto a conveyor system 660 at a tile loading/unloading station 665 at step 605. The conveyor system 660 transports the field tiles 100 through a wet cutting or milling station 570 at step 610. As described above, the wet cutting or milling station can incorporate the bullnose edge, or other edge, into the tile 300. After cutting or milling, and now in bullnose form, the tiles 300 can remain on the conveyor system 660 and the conveyor system 660 can transport the tiles through a drying chamber 575 at step 615. The dried tiles can then be transported by the conveyor system 660 through one or more first coating stations 680 at step 620. The first coating station 680 can apply at least a first base coat to the bullnose edge. For example, the first coating station 680 can coat the bullnose edge with one or more base coats and/or one or more tie coats to the tiles 300. According to some embodiments, a base coat can provide a solid color to the bullnose edge on top of which a decorative coat may be placed. For example, a base coat may be a white coat that serves to cover the underlying color of the tile. According to some embodiments, a base coat can be a white pigmented, UV curable coating based on either epoxy-acrylate or urethane acrylate chemistries. A tie coat can be a coating used to improve the adhesion of a base coat to the surface of the tile. A tie coat can have a low viscosity and/or be water-based. For example, a tie coat can be a UV curable, water based polyurethane dispersion. According to some embodiments, a tie coat can penetrate the pores of the tile, thereby adding durability to the coatings applied to the surface of the tile. A base coat or tie coat can be applied by first coating station 680 using a coating element 685. As will be understood by those of skill in the art, a coating element 685 may take many forms, such as, for example but not limited to, rollers that roll the coat onto the surface of the tile, sprayers that can spray a coat onto the surface of the tile, or dispensers that can pour the coating onto the surface of the tile. According to some embodiments, if a tie coat is used in addition to a base coat, there can be an additional step of flashing off water in a dryer chamber before coating the base coat on top of it. In some embodiments, the tie coat does not need to be UV cured separately before coating the base coat and they can be cured together at the same time.

After a first coat is applied to the bullnose edge, the first coat can be cured by exposing the coat to radiation lamps at one or more first curing stations 585 at 625. Curing stations 585 may operate as described previously with respect to FIG. 5, and further below. After curing the first coat, the conveyor system 660 can transport the tiles through a printing station 580 at step 630. The print station 580 can comprise printers that can print a decorative coat on the surface of the bullnose edge on top of the base coat (optionally including the tie coat). The decorative coat may comprise one or more layers of print media, which can include radiation curable ink(s), on the bullnose edge of the tile at step 630. Similar to what was previously described above with respect to FIG. 5, after printing, the radiation curable inks can be cured by exposing the inks to radiation lamps at one or more second curing stations 585 at step 635. Likewise, if one or more additional layers of print media are desired to be applied on top of the tiles, multiple printing stations 580 and second curing stations 585 can be placed in series. Alternatively, the conveyor system 660 can have an optional rerouting pathway, or loop, to redirect the tiles through the print station 580 and second curing station 585 as many times as desired or necessary.

After being cured at second curing station 585, the tiles can then be transported by the conveyor system 660 through one or more second coating stations 680. Coating station 680 can be configured to apply a second coating to the bullnose edge of the tile in a manner similar to that described above with respect to the first coating station 680. A second coating can be a protective coating. A protective coating can be a clear coating that adds protection to the surface of the tile and prevents the decorative tile from scraping or wearing off. A protective coat can be water resistant and/or provide a desirable finish to the surface of the tile. According to some embodiments, a protective coat is a UV curable, clear coat based on polyurethane or polyester chemistries. After a second coating is applied to the bullnose edge, the second coating can be cured by exposing the coating to radiation lamps at one or more third curing stations 585 at 645. The third coating station 585 can cure the second coating in a manner similar to that previously described with respect to the curing of the first coating and the decorative coating.

In some embodiments, after coating 640 and curing 645 are complete, the tiles 695 with the cured inks are brought to a sorting and packaging station 690 where they can be sorted and packaged for shipment at step 650. Sorting can be done by a quality inspector (manual or automated) that checks for defects and arranges the tiles 695 as needed. Packaging can be done with machines that pick a certain number of tiles 695, place the tiles 695 on flat carton boards, and fold the boards to create cartons (not shown). The cartons can be shrink-wrapped or taped. Transportation of the tiles 695 can be accomplished throughout by the conveyor system 660.

According to some embodiments all coatings and print media applied to the bullnose tiles in manufacturing process 600, including a base coat, a tie coat, a decorative coat and a protective coat, can be UV curable. As described above, coatings may be applied to tiles by coating stations 680 and inks may be applied to tiles by printing stations 580. Manufacturing process 600 can provide increased speed, reduced labor and improved aesthetics in decorating and coating the bullnose edge of a tile to match the rest of the tile.

Accordingly, as can be seen by comparing FIGS. 4, 5, and 6, manufacturing processes in accordance with this disclosure, as shown in FIGS. 5 and 6, for example, can automate the tile manufacturing process thereby significantly reducing labor and associated cost, overall manufacturing cost, and unnecessary complications such as the use of carts. This automation can also improve the quality of the final product by reducing human error inherent in manual processes and the shortcomings of manually applied paints. Some of the steps of FIGS. 5 and 6 will now be discussed in greater detail.

In some embodiments, tile loading/unloading station 565, 665 can comprise a machine arm that pushes a tile from the top of a tile stack on to a receiving plate that lowers it on to the conveyor system 560, 660. Further, in some embodiments, the conveyor system 560, 660 can be an in-line conveyor belt system. Such a system can greatly reduce the footprint and the space requirements for the equipment implementing the manufacturing process, i.e., the tile loading/unloading station 565, 665, cutting or milling station 570, drying chamber 575, print station 580, curing stations 585, coating stations 680, and sorting and packaging station 590, 690, for example. An in-line process (or conveyor process generally) can also reduce or eliminate the need to load tiles onto carts for certain manufacturing steps, thereby saving time and reducing manual labor.

In some embodiments, the cutting or milling station 570 can be a wet cutting station. The wet cutting station can comprise one or more cutting blades to cut the field tile into smaller pieces and provide a rounded, bullnose edge or other non-straight edge. The wet cutting station can apply a liquid, such as water or other coolants and/or lubricants on the tile during cutting. In some embodiments, the tiles can be cut without being removed from the conveyor system 560, 660.

The drying chamber 575, in some embodiments, can comprise electric coil heaters or gas fired burners arranged in a covered, insulated housing. The drying chamber 575 can rid the tile of moisture to prepare the tile for subsequent processing. In some embodiments, the tiles can be dried on the conveyor system 560, 660.

In some embodiments, the print station 580 can comprise one or more printers 581, such as inkjet printers. The printers 581 can precisely locate print media, which can include radiation curable inks, on the rounded, bullnose edge. Moreover, the print media can be printed in high resolution. In some embodiments, therefore, the printer 581 can have print heads that are disposed at an angle. In other words, the print heads can have a printing surface that is neither parallel to the top surface of the tile nor perpendicular to the top surface of the tile. Instead, the printing surface can be disposed at an angle to the top surface of the tile to enable quality printing on the bullnose edge or other decorative edge. The angle can, of course, be adjusted based on several factors, such as the shape or size of the bullnose or other decorative edge, such as a non-straight edge. In some embodiments, the angle can be 45 degrees, about 45 degrees, or between 30 and 60 degrees. In some embodiments, a printer head can rotate across a range of 0 to 90 degrees. A position-adjustable print head can allow the system to print inks and print media to the edge of bullnose tiles having different thicknesses by adjusting the angle of the print head for each different thickness of tile. So, for example, the manufacturing processes 500 and 600 may be used in a first production run on a first set of bullnose tiles having a first thickness and then may be used in a second production run on a second set of bullnose tiles having a second thickness by simply adjusting the angle of the position-adjustable print heads between the first and second production runs.

In some embodiments, the print media can comprise solid powder instead of printed inks. In these embodiments, electrostatic spraying equipment may be used instead of a printer.

Figure 7:
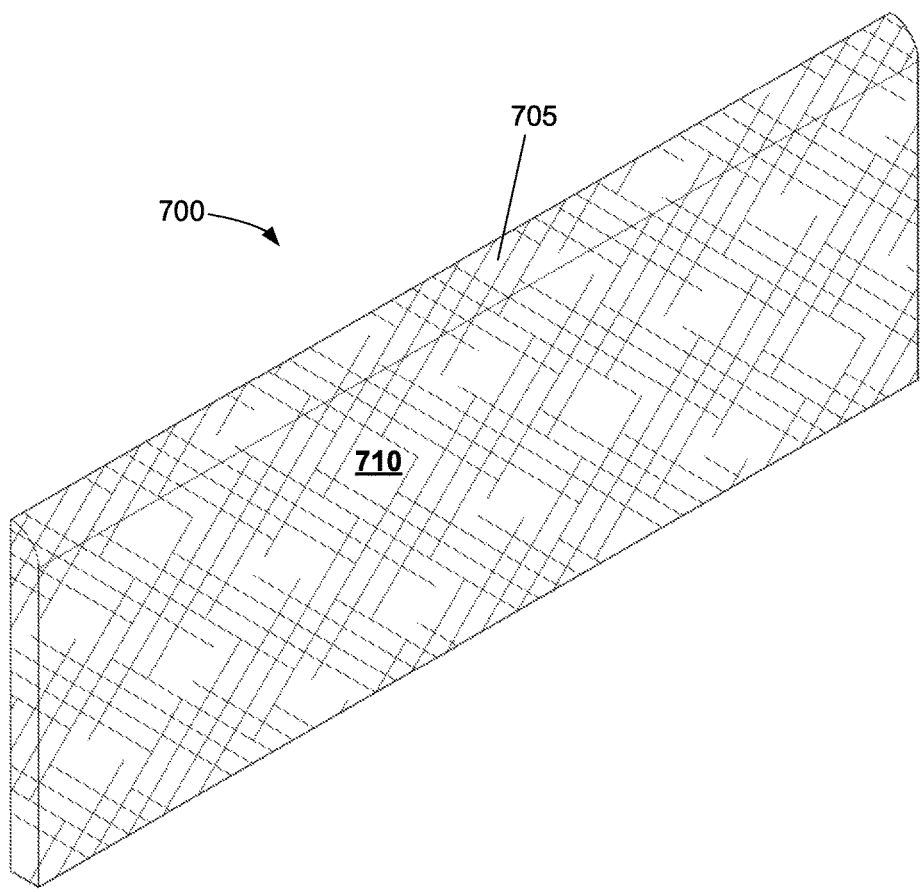
FIG. 7 depicts a bullnose tile, in accordance with some embodiments of this disclosure.

As explained above, the printer 581 can print radiation curable inks. The printer 581 can apply the inks in a carefully controlled process to ensure that the desired graphic, color, pattern, and amount of ink are applied. As shown in FIG. 7, this process can result in a bullnose edge 705 that matches the color and pattern of the top 710 of the tile 700 much more closely than in conventional bullnose tiles 200, as shown in FIG. 2. In addition, the use of a printer 581 and inks can eliminate much of the complexity associated with maintaining multiple color recipes.

Moreover, the print media, including the inks, can be applied in one or more layers. For example, in some embodiments, a radiation curable base coat can be applied first, a radiation curable decorative coat can be applied next, and a radiation curable protective coat can be applied last. In some embodiments, an optional tie coat may be applied before the base coat. Each of these layers, and other additional layers, can be optionally applied or applied multiple times. In some embodiments, a base coat can be applied to the bullnose edge first. The base coat can be white to provide a desirable surface upon which to print subsequent layers. After the base coat, a decorative coat can then be applied, which can include or apply the design or graphic on the tile. A wear resistant clear coat may then be applied on top of the decorative coat to provide a desirable finish. In addition, a clear coat can be desirable to protect the other printed layers of the tiles as these layers may not be as durable as the layers on the top of the tile, depending on a number of factors, including the types of print media and/or inks used. In some embodiments, printing can take place while the tiles are on the conveyor system 560.

In some embodiments, the radiation curable inks can be 100% solid, solvent-borne or water-based, or solid powders (such as in powder coatings). The inks can comprise binders/ monomers based on acrylate, unsaturated polyester, polyester-acrylate, epoxide-acrylate, urethane-acrylate, polyurethane or polyurethane-acrylate dispersions (PUD), or blends of the above. The inks can be tinted with organic or in-organic pigments, dyes or colorants. In some embodiments, the inks or protective clear coat are not tinted or colored to maintain clarity. The inks and coatings can further comprise carefully selected combinations of photo-initiators that may include hydroxy-ketones and/or acyl phosphine oxides. The inks can be ultraviolet (UV) curable inks.

In some embodiments, the inks can be electron beam (EB) curable inks. The main difference in EB curable inks, as compared to UV curable inks, is the energy or wavelength of radiation and the need for photoinitiator chemicals used in the inks. EB inks are more energetic with a shorter wavelength range, typically less than 1 nanometer, that generally does not require a photo-initiator being added to the ink. On the other hand, UV inks are less energetic with longer wavelength range, generally between 200 and 400 nanometers, that requires a photo-initiator.

In some embodiments, curing stations 585 can include one or more radiation lamps 586. The radiation lamps 586 can be UV radiation lamps or EB radiation lamps, or both, depending on the type of ink used. The curing stations 585 can therefore expose the tile, including the radiation curable inks, to the radiation lamps 586, which can be disposed above the tile. The radiation lamps 586 can thus cure the radiation curable inks on the tile. In some embodiments, curing of the inks is carried out by properly selecting radiation lamps 586 with output spectra that match the absorption range of photo-initiators in the inks. Thus, when the inks are exposed to the output spectra from the lamps 586, the inks can cure on the tile.

As referenced above, the radiation lamps 586 can cure the inks after each layer of ink is applied, or after two or more of the layers of ink are applied. Thus, the lamps can cure the inks between each printing step 520, 630 or after all printing steps 520, 630 are completed. Advantageously, the radiation lamps 586 can cure the radiation curable inks very quickly. In some embodiments, for example, the inks can be cured in ten seconds or less, five seconds or less, three seconds or less, two seconds or less, or one second or less, depending on a number of factors. This can be extremely advantageous over known paint drying techniques, which can routinely take twenty minutes or longer. In addition, the radiation lamps 586 can cure the inks at room temperature. Thus, the tiles emerge cool, and ready for subsequent processing. There is also no need to maintain a large dryer at a high temperature, or to wheel carts into or out of the dryer. Thus, curing under radiation lamps 586 can increase manufacturing speed and can also reduce overhead costs. In some embodiments, the tiles can be cured on the conveyor system 560, 660.

It is worth noting that, in some embodiments, one or more of the layers of print media, including ink, can be air or heat cured. Moreover, one or more of the layers can be painted on or applied with roller coating in automated processes. These embodiments may result in longer manufacturing times, but may provide other advantages. For example, in some embodiments, it may be possible that a painted and air dried wear resistant clear coat will better protect some layers of printed and cured decorative inks in some circumstances. In other embodiments, however, the printed and cured protective coats can be equally as durable, or more durable, than painted protective coats.

As explained above, a plurality of printing stations 580 and curing stations 585 can be configured in series. This can enable the printing and curing of multiple layers of ink on the tiles. For example, in some embodiments, a base coat can be applied first by a first printing station 580, and the tile can then be brought to a first curing station 585 for curing of the ink. Next, a decorative coat of ink can be applied by a subsequent printing station 580, and the tile can be brought to a subsequent curing station 585 for curing. A protective coat of can then be applied by another printing station 580 and cured by another curing station 585. In some embodiments, multiple base coats, decorative coats, and/or protective coats can be applied and cured in this series configuration. Alternatively, the conveyor system 560, 660 can have an optional rerouting pathway, such as an optional loop, to redirect the tiles through printing station 580 and curing station 585 as many times as desired or necessary. In this manner the same printing station 580 and curing station 585 (or series thereof) can be used to apply and cure the various layers of inks. It will be understood by those of skill in the art that although FIGS. 5 and 6 illustrate example embodiments of manufacturing processes 500, 600, that there may be many different configurations and combinations of the various coating, printing, curing, cutting and drying stations described herein. For example, although FIG. 6 illustrates three separate curing stations 585, in some embodiments there may only be one curing station 585, that conveyor is configured to transport the tiles through three times. Thus, any number of stations can be used to achieve the embodiments shown in FIGS. 5 and 6, and many other configurations of stations not explicitly shown in the drawings are also contemplated herein.

In some embodiments, after printing 520, 630 and curing 525, 635 are complete, the tiles 595,695 with the cured inks are brought to a sorting and packaging station 590, 690 where they can be sorted and packaged for shipment at step 530, 650. Sorting can be done by a quality inspector (manual or automated) that checks for defects and arranges the tiles 595, 695 as needed. Packaging can be done with machines that pick a certain number of tiles 595, 695, place the tiles 595, 695 on flat carton boards, and fold the boards to create cartons (not shown). The cartons can be shrink-wrapped or taped. Transportation of the tiles 595, 695 can be accomplished throughout by the conveyor system 560, 660.

One of skill in the art will recognize that the presently disclosed systems and processes provide significant advantages over know systems and processes. Moreover, even if known processes, such as those shown in FIG. 4, were automated, the presently disclosed system would still provide considerable advantages over those automated processes. For example, the use of printers, radiation curable inks, and curing stations would provide significant advantages in color matching, pattern matching, and manufacturing times.

FIG. 7 shows a tile in accordance with the present disclosure. As shown, the tile comprises a bullnose edge 705 with a printed layer matching the color and design on the top 710 of the tile 700. Since FIG. 7 is shown in black and white, only the pattern consistency is visible, but those of skill in the art will understand that the color is consistent as well, and is also more consistent than the color of the conventional bullnose tile in FIG. 2.

It will be understood, in cases where the decorative front face of the tile comprises an intricate pattern, such as a wood grain pattern or a marble pattern, that the upper face or edge of the tile, whether it is a bullnose edge, a beveled edge or a lowered perimeter portion, may be provided with a digitally printed pattern that can seamlessly merge with the pattern of the front face. In the case of a wood pattern, this would lead to printed wood grain lines running uninterruptedly, or without noticeable interruption across the seam between the decorative front face and the upper face or edge. A similar effect could be reached with veins in a marble pattern.

The digitally applied pattern on the upper face or edge of the tile may also incorporate branding. For example, the digitally applied pattern may include an image, character or logo.

Figure 8:
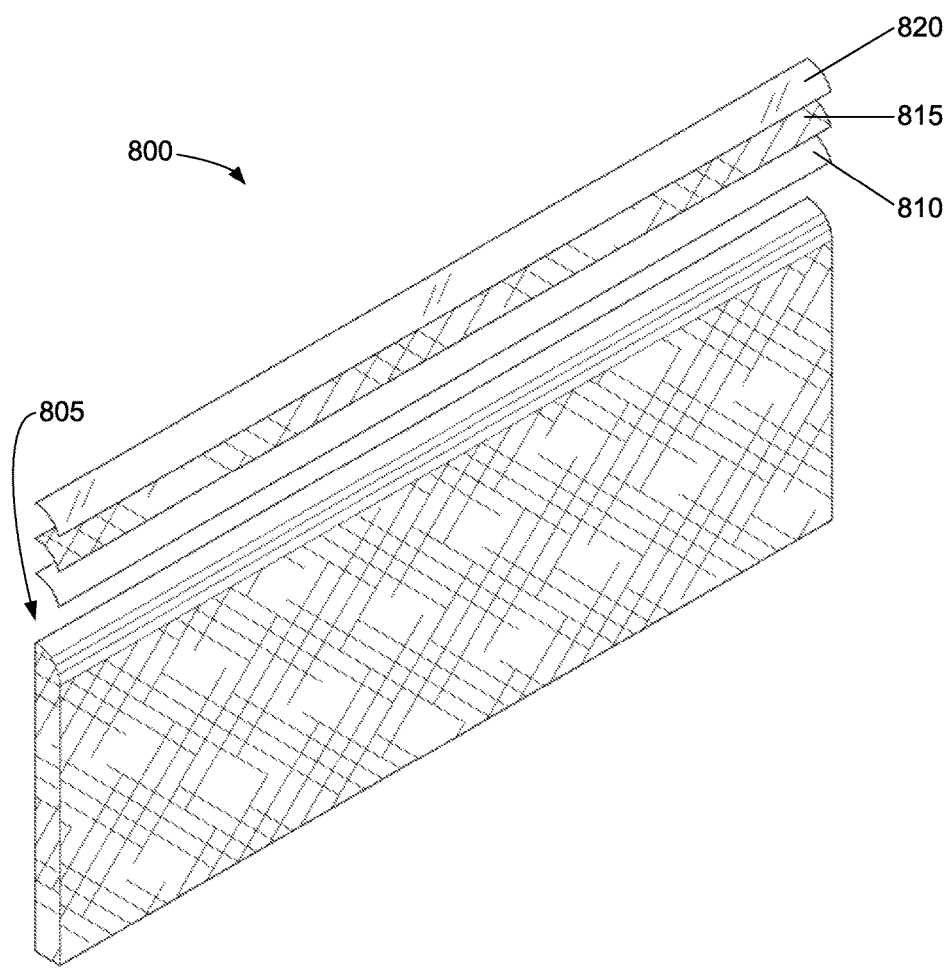
FIG. 8 depicts an exploded view of a bullnose tile, in accordance with some embodiments of this disclosure.

FIG. 8 shows the tile of FIG. 7 in an exploded state. As shown, the tile 800 comprises a bullnose edge 805 with a base coat 810, a decorative coat 815, and a protective coat 820, exploded for easier viewing. As described above, one or more of the coats can be printed on and cured. Some embodiments may include an optional tie coat between the base coat 810 and the surface of the bullnose edge.

As those of skill in the art will understand, the processes described above can produce tiles in a variety shapes and sizes. For example, the processes described above can yield 3 inch by 12 inch bullnose tiles, which is a very common and desired size. The processes described above can also yield tiles in larger and smaller sizes.

While certain systems and methods related to tile edge systems and methods have been disclosed in some exemplary forms, many modifications, additions, and deletions may be made without departing from the spirit and scope of the system, method, and their equivalents, as set forth in claims to be filed in a later, non-provisional application. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other devices, methods, and systems for carrying out the several purposes of the embodiments and claims presented in this application. It is important, therefore, that the claims be regarded as including such equivalent constructions.

What is claimed is:

1. A method of manufacturing a bullnose tile, comprising:
providing a field tile, wherein said field tile is a fired ceramic tile comprising a base and a decoration;
transforming the field tile by cutting and then rounding off a longitudinal edge to form a bullnose edge;
coating at least one of a radiation curable base coat or a tie coat on the bullnose edge and curing the base coat or tie coat;
printing a decorative coat comprising print media on the cured base coat or cured tie coat on the bullnose edge and curing the print media; and
coating a radiation curable protective coat on the cured print media on the bullnose edge and curing the protective coat to provide the bullnose tile.

2. The method of claim 1, wherein the print media comprises radiation curable ink.

3. The method of claim 2, wherein curing the print media comprises exposing the print media to a radiation lamp.

4. The method of claim 1, further comprising wet cutting the field tile to form the bullnose edge, drying after wet cutting, and sorting and packaging the bullnose tile after curing the protective coat.

5. The method of claim 4, wherein the field tile is transported on an in-line conveyor system during wet cutting, drying, printing, curing the print media, and curing the protective coat.

6. The method of claim 1, wherein said rounding off reveals a portion of the base of the field tile at the bullnose edge.

7. The method of claim 1, wherein printing a decorative coat comprises printing with print heads that are disposed at an angle to a top surface of the tile having the cured base coat or cured tie coat on the bullnose edge.

* * * * *